(12) United States Patent
Chen et al.

(10) Patent No.: US 10,785,064 B1
(45) Date of Patent: Sep. 22, 2020

(54) SEMICONDUCTOR DEVICE AND METHOD THEREFOR

(71) Applicant: SEMICONDUCTOR COMPONENTS INDUSTRIES, LLC, Phoenix, AZ (US)

(72) Inventors: Tai-Hua Chen, Chanlder, AZ (US); Jefferson W. Hall, Chandler, AZ (US); Florin Cornel Vladoianu, Bucharest (RO); Randall Gray, Tempe, AZ (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 16/659,998

(22) Filed: Oct. 22, 2019

Related U.S. Application Data

(60) Provisional application No. 62/884,749, filed on Aug. 9, 2019.

(51) Int. Cl.
*H04L 25/02* (2006.01)
*H04B 1/04* (2006.01)
*H04B 15/00* (2006.01)

(52) U.S. Cl.
CPC ....... *H04L 25/0266* (2013.01); *H04B 1/0475* (2013.01); *H04B 15/00* (2013.01)

(58) Field of Classification Search
CPC .... H04B 15/00; H04B 1/0475; H04L 25/0266
See application file for complete search history.

(56) References Cited

U.S. PATENT DOCUMENTS

| | | | |
|---|---|---|---|
| 2016/0065156 A1 | 3/2016 | Candage | |
| 2016/0308497 A1* | 10/2016 | Park | G05F 1/625 |
| 2017/0005580 A1* | 1/2017 | Morroni | H02M 3/33569 |
| 2017/0133986 A1 | 5/2017 | Candage | |
| 2017/0201399 A1 | 7/2017 | Adinarayana et al. | |

OTHER PUBLICATIONS

ON Semiconductor, "NCD5700—Isolated High Current IGBT Gate Driver," Publication Order No. NCD57000/D, Feb. 2019, Rev. 2, 13 pages.
Ruida Yun et al., "Transformer-based Digital Isolator With 20kVPK Surge Capability and > 200kV/uS Common Mode Transient Immunity," 2016 Symposium on VLSI Circuits Digest of Technical Papers, IEEE 978-1-5090-0635, 2 pages.

* cited by examiner

*Primary Examiner* — Kevin Kim
(74) *Attorney, Agent, or Firm* — Robert F. Hightower

(57) ABSTRACT

In one embodiment, a transmitter circuit may be configured to transmit a signal to a receiver. The transmitter circuit may also be configured to detect receiving energy from a transient event, for example detect a transient current, and to direct at least a portion of the energy away from the transmitted signal while the transmitter circuit is transmitting the signal.

19 Claims, 7 Drawing Sheets

US 10,785,064 B1

SEMICONDUCTOR DEVICE AND METHOD THEREFOR

CROSS-REFERENCE TO RELATED APPLICATIONS

This application claims the benefit of U.S. Provisional Patent Application No. 62/884,749, filed on Aug. 9 2019, the entire contents of which is incorporated herein by reference.

BACKGROUND OF THE INVENTION

The present invention relates, in general, to electronics, and more particularly, to semiconductors, structures thereof, and methods of forming semiconductor devices.

In the past, the semiconductor industry utilized various methods and structures to form isolated communication circuits that have two electrically isolated sections. In some applications, the two sections were galvanically isolated. Such systems typically included a transmitter section that transmitted signals to a receiver section through some isolation means.

During operation of the circuits, a transient electrical event, such as a voltage transient or a current transient, could occur and couple energy into the system. Such an event could disrupt the communication. In some applications, the transient event could disrupt the transmitter signal or even disrupt the operation of the transmitter.

Accordingly, it is desirable to have a system that can continue to transmit during a transient event, or that more reliably transmits information during the transient event.

Figure 1:
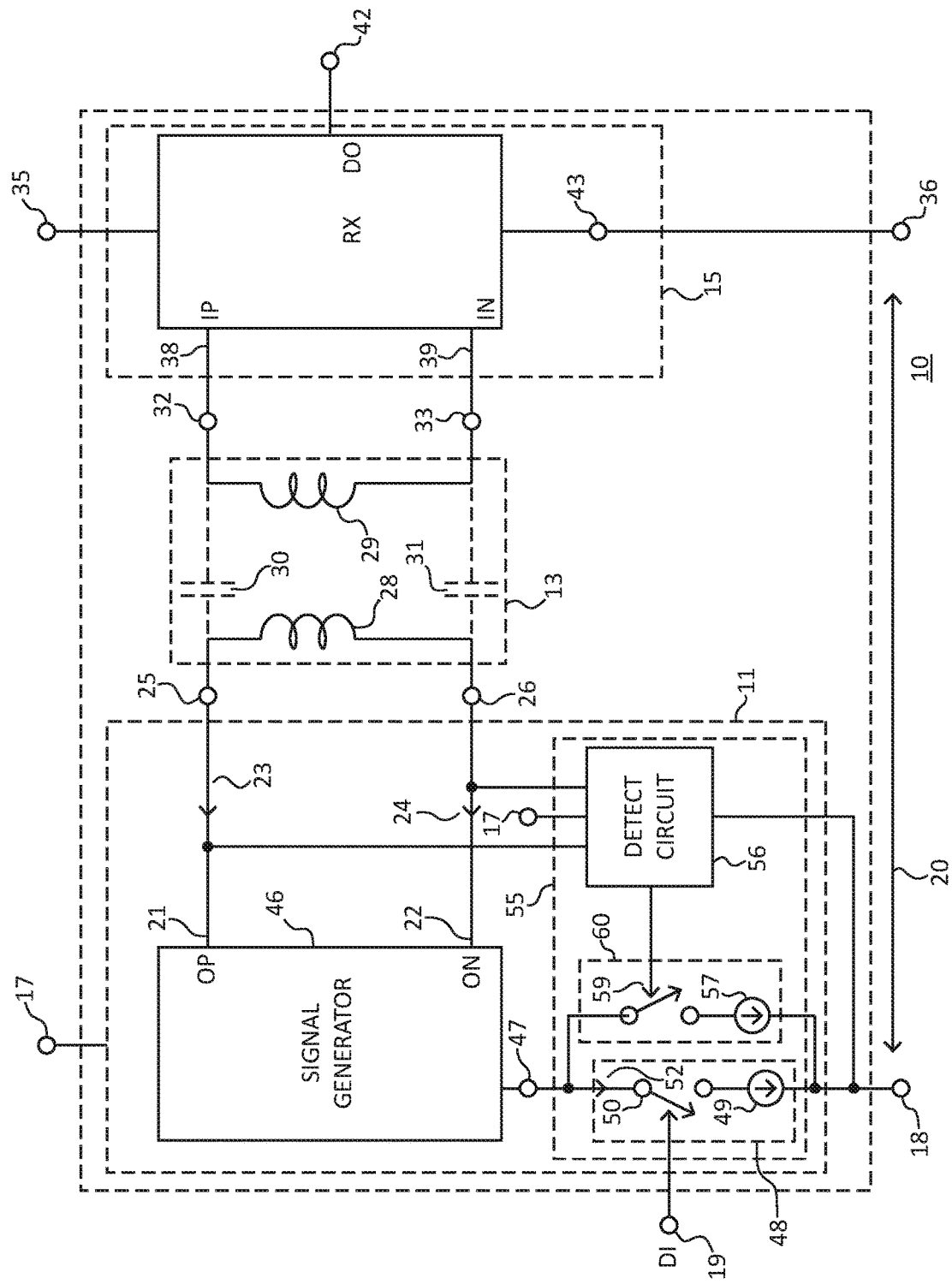
FIG. 1 schematically illustrates an example of an embodiment of a portion of an isolated communication system in accordance with the present invention.

For simplicity and clarity of the illustration(s), elements in the figures are not necessarily to scale, some of the elements may be exaggerated for illustrative purposes, and the same reference numbers in different figures denote the same elements, unless stated otherwise. Additionally, descriptions and details of well-known steps and elements may be omitted for simplicity of the description. As used herein current carrying element or current carrying electrode means an element of a device that carries current through the device such as a source or a drain of an MOS transistor or an emitter or a collector of a bipolar transistor or a cathode or anode of a diode, and a control element or control electrode means an element of the device that controls current through the device such as a gate of an MOS transistor or a base of a bipolar transistor. Additionally, one current carrying element may carry current in one direction through a device, such as carry current entering the device, and a second current carrying element may carry current in an opposite direction through the device, such as carry current leaving the device. Although the devices may be explained herein as certain N-channel or P-channel devices, or certain N-type or P-type doped regions, a person of ordinary skill in the art will appreciate that complementary devices are also possible in accordance with the present invention. One of ordinary skill in the art understands that the conductivity type refers to the mechanism through which conduction occurs such as through conduction of holes or electrons, therefore, that conductivity type does not refer to the doping concentration but the doping type, such as P-type or N-type. It will be appreciated by those skilled in the art that the words during, while, and when as used herein relating to circuit operation are not exact terms that mean an action takes place instantly upon an initiating action but that there may be some small but reasonable delay(s), such as various propagation delays, between the reaction that is initiated by the initial action. Additionally, the term while means that a certain action occurs at least within some portion of a duration of the initiating action. The use of the word approximately or substantially means that a value of an element has a parameter that is expected to be close to a stated value or position. However, as is well known in the art there are always minor variances that prevent the values or positions from being exactly as stated. It is well established in the art that variances of up to at least ten percent (10%) (and up to twenty percent (20%) for some elements including semiconductor doping concentrations) are reasonable variances from the ideal goal of exactly as described. When used in reference to a state of a signal, the term "asserted" means an active state of the signal and the term "negated" means an inactive state of the signal. The actual voltage value or logic state (such as a "1" or a "0") of the signal depends on whether positive or negative logic is used. Thus, asserted can be either a high voltage or a high logic or a low voltage or low logic depending on whether positive or negative logic is used and negated may be either a low voltage or low state or a high voltage or high logic depending on whether positive or negative logic is used. Herein, a positive logic convention is used, but those skilled in the art understand that a negative logic convention could also be used. The terms first, second, third and the like in the claims or/and in the Detailed Description of the Drawings, as used in a portion of a name of an element are used for distinguishing between similar elements and not necessarily for describing a sequence, either temporally, spatially, in ranking or in any other manner. It is to be understood that the terms so used are interchangeable under appropriate circumstances and that the embodiments described herein are capable of operation in other sequences than described or illustrated herein. Reference to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but in some cases it may. Furthermore, the particular features, structures or characteristics may be combined in any suitable manner, as would be apparent to one of ordinary skill in the art, in one or more embodiments. For clarity of the drawings, doped regions of device structures are illustrated as having generally straight line edges and precise angular corners. However, those skilled in the art understand that due to the diffusion and activation of dopants the edges of doped regions generally may not be straight lines and the corners may not be precise angles.

The embodiments illustrated and described hereinafter suitably may have embodiments and/or may be practiced in the absence of any element which is not specifically disclosed herein.

DETAILED DESCRIPTION OF THE DRAWINGS

FIG. 1 schematically illustrates an example of an embodiment of a portion of an isolated communication system 10 that has improved operation during a transient event. System 10 includes a transmitter circuit 11 that transmits information to a receiver circuit 15 through an isolation means. The isolation means may have an embodiment of a transformer 13, but may be a different isolation means in other embodiments such as capacitor isolation elements or other elements. Transformer 13 includes a primary winding 28 that is coupled to secondary winding 29. An embodiment may include that windings 28 and 29 are coupled by a magnetic field formed by winding 28, or alternately though other means. Some embodiments of transformer 13 may include parasitic elements represented in a general manner by capacitors 30 and 31 that may be coupled between windings 28 and 29. Other parasitic elements may be included in other embodiments.

Transmitter circuit 11 is isolated from receiver circuit 15. For example, circuit 11 may be galvanically isolated from circuit 15. In some embodiments, circuit 11 may be formed on a first semiconductor die and circuit 15 may be formed on a different or second semiconductor die. Transformer 13 may be formed on the first semiconductor die or alternately on the second semiconductor die. The first and second semiconductor die may be assembled into one semiconductor package, such as for example on two different lead frames in the same package. Such an arrangement assists in providing electrical isolation between the first and second semiconductor die. In other embodiments, circuit 11 and circuit 15, along with the isolation means, may be formed on one semiconductor die. For example, at least portions of a die may be electrically isolated utilizing a Silicon on Insulator (SOI) type die. Some embodiments may also include trench isolation technology.

Circuit 11 is configured to receive operating power between a voltage input 17 and a common return 18. In some embodiments return 18 may be a ground potential for circuit 11. Circuit 15 receives operating power between a voltage input 35 and a common return 36. The voltages applied to inputs 17 and 35 are provided by two different sources of voltage and often may be different values or alternately may be the same value. Returns 18 and 36 may also be isolated from each other. Consequently, there may be a potential difference between the values of returns 18 and 36, which is indicated in a general manner by an arrow 20.

Circuit 11 includes a transient compensation circuit 55 and a signal generator circuit 46. Circuit 11 receives, on a data input (DI) 19, a data input (DI) signal to be transmitted to circuit 15. Circuit 11 forms the output signal as a differential signal having a positive portion (OP) on a positive output 21, and having a negative portion (ON) on a negative output 22. Circuit 11 drives transformer 13 with the output signal. Circuit 15 receives the transmitted signal from transformer 13 and translates it into a data output (DO) signal on an output 42. In general, the DO signal is representative of the data input (DI) signal received on input 19.

Figure 2:
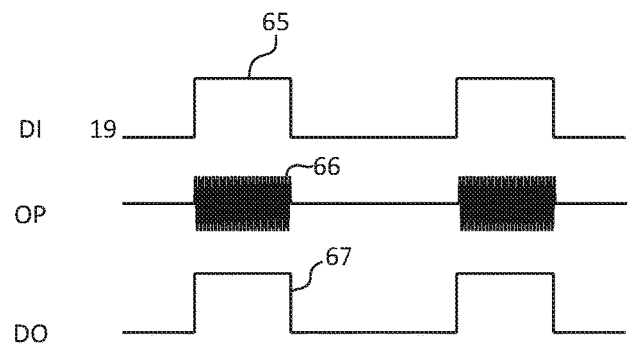
FIG. 2 is a graph having plots that illustrate in a general manner portions of an embodiment of some of the signals that may be formed during the operation of an embodiment of the system of FIG. 1 in accordance with the present invention.

FIG. 2 is a graph having plots that illustrate in a general manner portions of an embodiment of some of the signals that may be formed during the operation of an example of an embodiment of system 10. The abscissa indicates time and the ordinate indicates increasing value of the illustrated signals. A plot 65 illustrates states of the data input (DI) signal received on input 19, a plot 66 illustrates a generalized illustration of an example embodiment of the OP signal formed on output 21 or alternately the ON signal formed on output 22, and a plot 67 illustrates some states of the data (DO) output signal on output 42.

In an embodiment, circuit 46 forms the output signal to include an oscillating differential signal (ODS) in response to an asserted state of data to be transmitted, and to terminate forming the ODS in response to a negated state of the data. In other embodiments, circuit 46 may form the oscillating differential signal (ODS) in response to opposite states of the data to be transmitted. An embodiment may include that the ODS is formed in response to states of the data input signal on input 19.

A plot 66 illustrates a conceptual example of a possible embodiment of the OP signal, or alternately ON signal, having an output value that includes an active state that oscillates within an oscillating range between a first value and a second value in response to circuit 46 forming the ODS. The first value may have an embodiment that is closer to the positive supply value than the second value is to the positive supply value, or alternately closer to the value of return 18 than the second value. For example, the first value may be near to the value on input 17, and the second value may be near to the return value on return 18. In some embodiments the first and second values may be reversed.

The OP signal, or alternately ON signal, also has an inactive state that may be within the oscillating range. An embodiment may include that the inactive state of the output signal is formed in response to termination of the ODS signal. The inactive state may be one of the first or second values or another value that may be in between the first and second values. For the example embodiment of FIG. 2, the inactive state is a value that is near a midpoint between the first value and the second value. The inactive state of the OP or ON signal may have different values for some other embodiments. For example, the inactive state of either or both of OP and ON may be a value that is near to the positive supply value, for example near to the value on input 17, or may be near to the return value on input 18, or may be some other value. In an embodiment, the active and inactive states are formed responsively to the respective asserted and negated states of the data to be transmitted. For example, the active and inactive states may be formed responsively to the respective asserted and negated states of the DI signal on input 19.

Those skilled in the art will understand that the ON signal formed on output 22 of circuit 46 will be similar to the OP signal illustrated in plot 66 however the cycles of the oscillating signal during the active state of the ON signal will be substantially out of phase with the oscillations of the active state of the OP signal. The ON signal and the OP signal may have an embodiment in which the active states may be approximately 180 degrees out of phase. Thus, the ON signal may oscillate within an oscillating range between a third value and a fourth value during the active state. An embodiment may include that one of the third value or fourth value of the ON signal may be substantially the same as one of the first or second values of the OP signal. For example, the first and third values may be substantially the same, but out of phase with each other.

As illustrated by plots 65-67, in response to an asserted state data to be transmitted, circuit 11 forms the active state of the output signal, as illustrated by the OP signal, including forming the ODS illustrated by plot 66. In most embodiments, circuit 11 forms the active state for the duration of the asserted state of input 19. However, the duration of the active state may be less in some embodiments, and circuit 15 would be configured to respond to the shorter duration. Circuit 15 receives the signal and responsively forms the data output (DO) signal to be representative of the data input (DI) signal.

Figure 3:
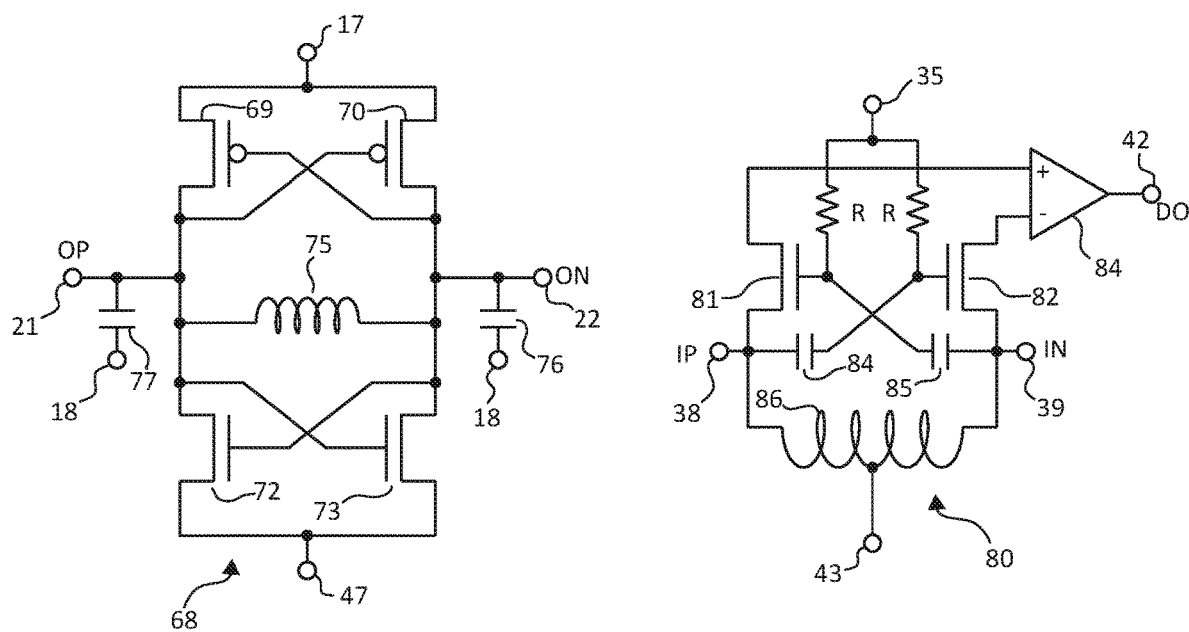
FIG. 3 schematically illustrates an example of portions of embodiments of some of the circuits of FIG. 1 in accordance with the present invention.

FIG. 3 schematically illustrates an example of a portion of an embodiment of an oscillator or oscillator circuit 68 that may be a portion of signal generator circuit 46 (FIG. 1), and also illustrates an example of a portion of an embodiment a demodulator circuit 80 that may be a portion of circuit 15 (FIG. 1). Circuit 68 is configured as an LC-tank oscillator where inductor 75 and capacitors 76-77 form a tuned circuit that controls the frequency at which the OP and ON signals oscillate. Inductor 75 and capacitors 76-77 may be formed on the semiconductor die along with circuit 68. An embodiment may include that circuit 46 oscillates at a frequency high enough to transmit signals through the transmission means. In some embodiments, circuit 46 may form the ODS signal to oscillate at least at approximately one GHz. Those skilled in the art will appreciate that the oscillator circuit of circuit 46 may have other embodiments instead of the embodiment of circuit 68 as long as the oscillator circuit forms the ODS signal in response to the state of the data to be transmitted. Also, circuit 15 may have other embodiments instead of or in addition to circuit 80 as long as circuit 15 forms the DO signal in response to at least the ODS signal. Those skilled in the art will appreciate that a separate load may be connected to each drain of transistors 81 and 82, such loads are not shown for simplicity of the drawings.

Referring back to FIG. 1, circuit 11 includes a bias circuit 48 that selectively forms a bias current 52 in response to the asserted state of the data to be transmitted. Circuit 48 may be connected to a bias output 47 of circuit 46. Current 52 forms a path to provide power to the oscillator of circuit 11 so that the oscillator forms an oscillating signal from which circuit 11 can form the output signal including ODS signal. In an embodiment, current 52 may be configured to bias the operating point of the oscillator. Also, circuit 11 may include other circuits in addition to circuits 46 and 55. Thus, circuit 11 may have an additional connection to return 18 (separate from the connection of circuit 48) for those additional elements.

The asserted DI signal on input 19 enables a switch 50 to selectively connect a current source 49 to at least the oscillator of circuit 46 to form bias current 52. An example embodiment may include that source 49 sinks current 52 from circuit 46. The negated state of the DI signal disables switch 50 to decouple the oscillator from current 52 thereby disabling the oscillator and circuit 46 from forming the oscillating signal and thus the ODS signal.

In some operating embodiments, a transient event may occur that couples energy into elements of system 10. In an embodiment, the transient event may cause the value of return 18 to change relative to return 36. The transient event can, in some cases, cause common mode currents 23 and 24 to flow to outputs 21 and 22, respectively, into circuit 11. Thus, the transient event may affect the operation of circuit 11 and the ODS signal.

An embodiment of circuit 55 includes a detect circuit 56 and a compensation circuit 60. As will be seen further hereinafter, an embodiment of circuit 56 may be configured to detect a transient event that affects either or both of outputs 21 and 22, and circuit 60 may be configured to form a compensation signal that minimizes the effect of the transient event. For example, circuit 56 may be configured to detect a transient current being coupled into one or more of outputs OP and ON. An embodiment may include circuit 56 being configured to detect one or more of outputs OP and ON changing to a value outside the value formed by the ODS signal. Circuit 56 may also have an embodiment that may include detecting one or more of outputs OP and ON increasing to a value greater than first value or decreasing to a value less than the second value.

In an embodiment, the compensation signal may be a compensation current 58 that conducts current from the transient event from the detected output through at least a portion circuit 55. Circuit 55 may have an embodiment that may be configured to conduct current from the transient event from output 47 through circuit 55. Another embodiment of circuit 55 may be configured to conduct current from the transient event from output 47 in addition the bias current. Circuit 55 may also have an embodiment configured to conduct current from the transient through at least apportion of the oscillator and away from bias circuit 48. An embodiment of circuit 46 may be configured to form the ODS signal during the transient event for at least a portion of an interval that circuit 55 conducts transient current.

Figure 4:
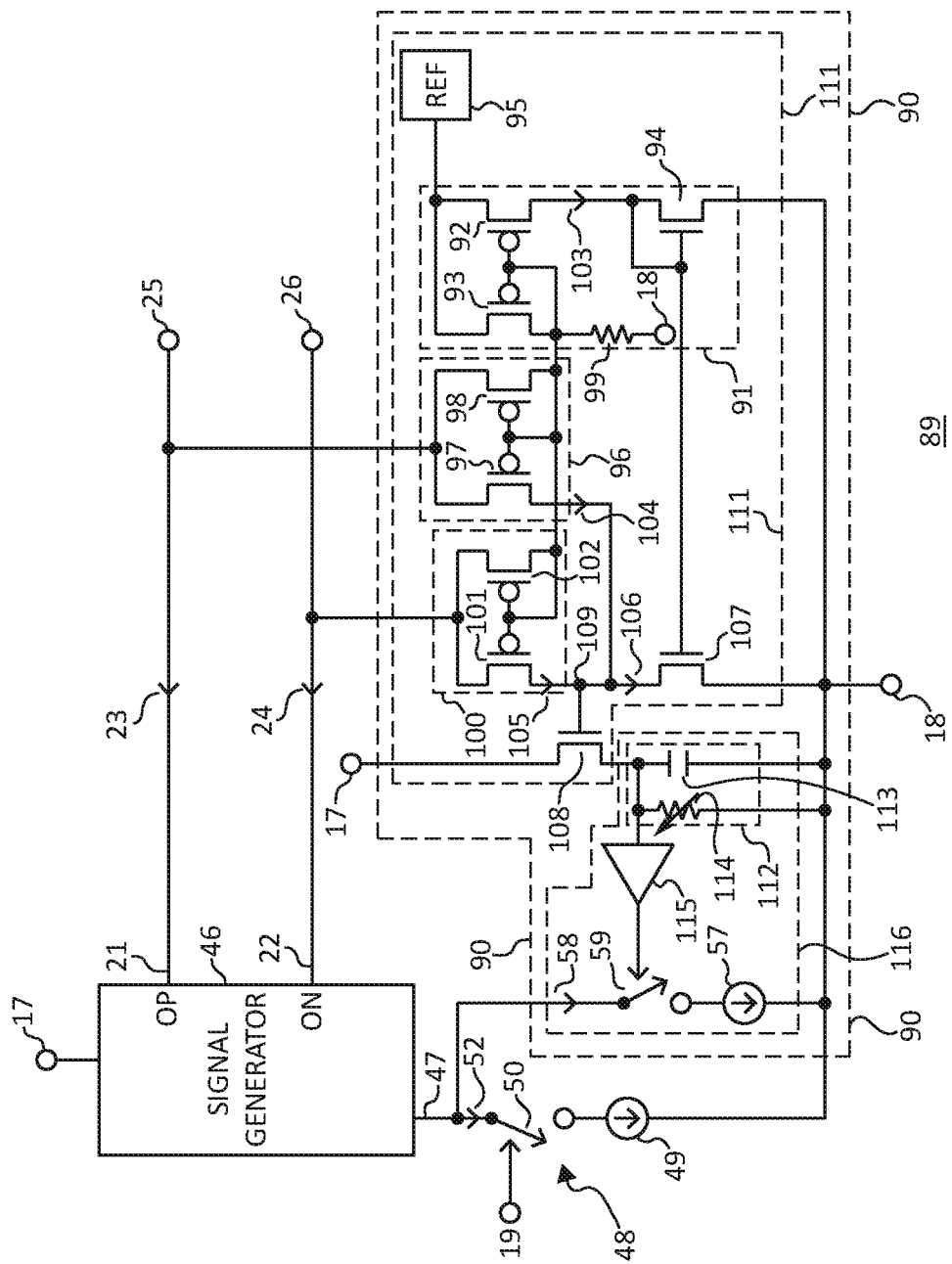
FIG. 4 schematically illustrates an example of an embodiment of a portion of a transmitter circuit that may have an embodiment that may be an alternate embodiment of a transmitter circuit of FIG. 1 in accordance with the present invention.

FIG. 4 schematically illustrates an example of an embodiment of a portion of a transmitter circuit 89 that may have an embodiment that may be an alternate embodiment of transmitter circuit 11 (FIG. 1). Circuit 89 includes a transient compensation circuit 90 that may have an embodiment that may be an alternate embodiment of circuit 55 (FIG. 1). Circuit 90 includes a transient detection circuit 111 and a compensation circuit 116 that may have embodiments that may be alternate embodiments of respective circuits 56 and 60.

As will be seen further hereinafter, circuit 90 may be configured to detect either of or both of outputs 21 or 22 receiving current from a transient event and to responsively conduct at least a portion of the current from output 47 and away from outputs 21 and 22. An embodiment of circuit 90 may be configured to detect either of or both of outputs 21 or 22 changing to a value outside the oscillating range and to responsively form a compensation signal that changes the value of the detected output to be substantially within the oscillating range. Circuit 90 may have an embodiment that may be configured to detect either of or both of outputs 21 or 22 changing to at least a threshold value outside the oscillating range. In an embodiment, circuit 90 may be configured to detect either of or both of outputs 21 or 22 increasing to greater than the first value and to responsively form a compensation signal that decreases the value of the detected output to substantially within the oscillating range. Circuit 90 may have an embodiment that may be configured to change the value of the output while circuit 89 continues to form the ODS signal. An embodiment of circuit 90 may also assert a transient detected signal in response to detecting the change of either of outputs 21 or 22. Alternately, circuit 90 may be configured to detect the transient event causing either of transient current 23 or current 24 to flow into respective outputs 21 and 22.

Circuit 111 includes a current mirror having a reference leg or reference section or reference circuit 91, a sensing section or sensing circuit 96, and another sensing section or sensing circuit 100. Reference circuit 91 forms a reference current 103 that is representative of a reference voltage from a reference generation circuit or reference circuit or Ref. circuit 95. Sensing circuit 96 is configured to receive the value of output 21 and detect the value of output 21 changing to a value outside the oscillating range of output 21. For example, circuit 96 may be configured to detect output 21 increasing to a value greater than the first value of the active state of output 21. Similarly, sensing circuit 100 is configured to receive the value of output 22 and detect the value of output 22 changing to a value outside the oscillating range. For example, circuit 100 may be configured to detect output 22 increasing to a value greater than the third value of the active state of output 22.

Circuit 91 receives the reference voltage and forms reference current 103 to flow through transistors 92 and 94 to return 18. Circuit 96 receives the signal on output 21. Circuit 96 includes a transistor 97 connected in a current mirror configuration with transistor 92 through a connection with transistors 98 and 93, and the connection of transistors 94 and 107. Transistor 97 receives the value on output 21 and forms a current 104 that is representative of the value of output 21.

Similarly, circuit 100 receives the signal on output 22. Circuit 100 includes transistor 101 that is also connected in a current mirror configuration with transistor 92 through the connection of transistors 102 and 93, and the connection of transistors 94 and 107. Transistor 101 receives the value on output 22 and forms a current 105 that is representative of the value of output 22. Currents 104 and 105 sum together and form a transient detected signal at node 109. Those skilled in the art will understand that currents 104 and/or 105 may have some oscillations in the part of the value that is greater than the threshold, but such oscillations do not affect the operation of transient detected signal at node 109. Additionally, those skilled in the art will appreciate that an embodiment of circuit 111 may include omitting transistors 98 and 101 from respective circuits 96 and 100.

Figure 5:
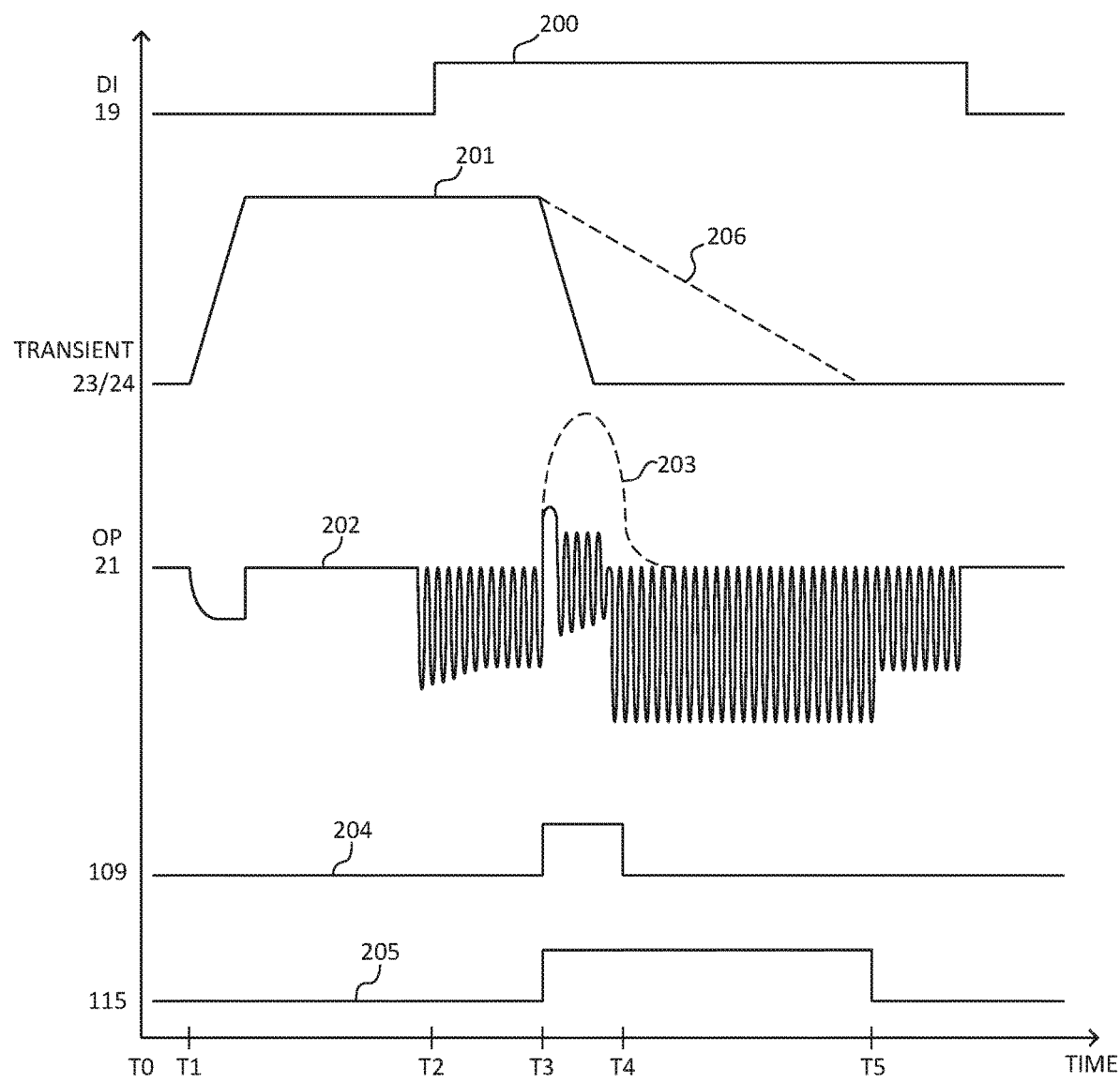
FIG. 5 is a graph that illustrates in a general manner an embodiment of values of some of the signals that may be formed during the operation of an embodiment of at least one of the circuits of FIG. 4 in accordance with the present invention.

FIG. 5 is a graph that illustrates in a general manner an embodiment of values of some of the signals that may be formed during the operation of circuit 89. The abscissa indicates time and the ordinate indicates increasing value of the illustrated signal. A plot 200 illustrates the DI signal received on input 19, a plot 201 indicates a transient event, a plot 202 indicates values of output 21, a plot 204 indicates the transient detected signal at node 109, and a plot 205 illustrates a compensation enable signal formed by circuit 90. This description has references to FIGS. 4 and 5. Although the following description is related to events on output 21, those skilled in the art will appreciate that the discussion also applies to events on output 22.

Assume that at a time T0, the DI signal is negated. Since the data to be transmitted is negated, current 52 is decoupled from the oscillator and circuit 46 does not form the ODS signal. Thus, outputs 21 and 22 are at the inactive state and do not form the ODS signal. Assume for this embodiment, the inactive state for both the OP and ON outputs is a value near to the value of the input voltage on input 17. An example embodiment may include that inactive state may have a value near to the voltage on input 17 minus some small voltage drop across one or two pullup transistors, for example a gate-to source threshold value of the transistor(s). Because outputs 21 and 22 are at the inactive state, currents 104 and 105 sum to form current 106 at a value that is no greater than the value of current 103. Thus, node 109 is pulled low by transistor 107 and the transient detected signal at node 109 is negated. The negated signal at node 109 disables transistor 108 which forces the output of buffer 115 low to disable or open switch 59. Since switch 59 is disabled, current 58 is decoupled from the oscillator. Thus, the oscillator does not receive current 58 from source 57.

Assume that at a time T1 a transient event occurs that causes a change in the value of outputs 21 and 22. The transient event affects both outputs 21 and 22 in the same manner, thus forms a common mode transient signal that changes the value of both outputs 21 and 22 in substantially the same manner. The positive portion of the transient event at time T1 causes common mode currents 23 and 24 to flow from circuit 46 into transformer 13 (the opposite direction of the arrows shown in FIG. 4). The rising edge of plot 201 indicates that the transient increases the amount of current 23, and also current 24, that is supplied by circuit 46. Since source 49 is decoupled from circuit 46, circuit 46 sources the current, such as from input 17 for example, which causes the dc voltage of outputs 21 and 22 to decrease as is illustrated by plot 202 at time T1. The voltage at output 47 may also decrease. Since circuit 46 was not transmitting the ODS signal, the decrease of outputs 21 and 22 does not affect the operation. If circuit 46 were transmitting the ODS signal, the decrease still would not affect the operation of the system.

Assume that at a time T2, the DI signal is asserted causing circuit 48 to couple current 52 to circuit 46. Circuit 46 responsively forms the active state of outputs 21 and 22. Circuit 46 responsively starts transmitting the ODS signal, thus, outputs 21 and 22 begin oscillating within the oscillation range causing the value on output 21 to oscillate or cycle between the first value and the second value as illustrated by plot 202. For example, outputs 21 and 22 may oscillate between the value of the inactive state and a lower value. Output 22 will also oscillate between the third value and the fourth value, for example, may oscillate between the inactive level and a lower level. The ODS signal on outputs 21 and 22 will be out of phase with each other, thus, output 21 will be at the inactive level when output 22 is at the lower level and vice versa.

Assume that at a time T3, the transient event begins to change. The negative edge of the transient event discharges current into circuit 46. For example, forms currents 23 and 24 to flow into respective outputs 21 and 22 (as illustrated by arrows). Because current source 49 forms a fixed value of current 52, the extra current flowing into outputs 21 and 22 causes the voltage at output 47 to increase. This increase causes the oscillations of outputs 21 and 22 to increase to a value greater than the inactive value as is illustrated the upper level of plot 202 at time T3.

Circuit 111 is configured to detect the value of output 21 increasing to greater than the inactive value. In response to the increased value of output 21, circuit 96 forms current 104 to flow. Similarly, circuit 100 will form current 105 in response to the increase of the value of output 22. Thus, the value of current 106 will increase. In response to current 106 becoming greater than current 103, the value of node 109 will increase and assert the transient detected signal at node 109 as illustrated at time T3. The signal at node 109 enables transistor 108 and pulls the input of buffer 115 high which asserts a compensation enable signal on the output of buffer 115 thereby enabling switch 59. Enabling switch 59 connects current source 57 and current 58 to output 47 and allows current 58 to discharge transient currents 23 and 24. Current 58 forms a path to conduct substantially currents 23 and 24 from respective outputs 21 and 22 without the transient currents flowing through circuit 48. This additional current path discharges the transient current causing the value of outputs 21 and 22 to decrease back to substantially the inactive value as illustrated in plot 202 by the upper value of output 21 decreasing back to substantially the inactive value near a time T4. An embodiment of circuit 58 may be configured to form the path to conduct the transient currents through the oscillator and through source 57 to return 18.

Without the additional current path to discharge current 23 and 24, the upper value of outputs 21 and 22 would continue to increase as illustrated by the dashed line portion 203 of plot 202. Such an increase could disrupt the operation of circuit 46 and stop transmission of the ODS signal. For example, the increase may cause the oscillator to stop operating.

As current 58 discharges currents 23 and 24, and decreases the value of outputs 21 and 22, the value of currents 104 and 105 also decreases which decreases the value of current 106. Consequently, the value of the transient detected signal at node 109 also decreases and may become negated as is illustrated by plot 204 near time T4. In some embodiments, circuit 116 may include a timer or timer circuit 112 that causes buffer 115 to continue asserting the output for an extended time interval and to form current 58 for the extended time interval. For example, a time interval longer than the asserted state of node 109. An embodiment of timer circuit 112 may include a capacitor 113 connected in parallel with a resistor 114. Timer circuit 112 maintains an asserted state of the input of buffer 115 for the extended time interval that is formed by the time constant of capacitor 113 and resistor 114. Thus, circuit 116 is enabled to continue forming the compensation signal, for example current 58, for this extended time interval as illustrated by plot 205.

While the compensation enable signal on the output of buffer 115 is asserted, current 58 may cause output 47 to decrease to a value less than the normal value of output 47. This decrease can extend the lower excursions of outputs 21 and 22 to be outside the oscillating range as illustrated by plot 202 between times T4 and T5. After time T5, switch 59 is disabled to decouple the compensation signal, for example current 58, from circuit 46 and the lower excursions of outputs 21 and 22 return to the oscillating range of the active levels.

In some applications, the falling edge of the transient event may have a low slew rate that slowly decreases currents 23 and 24 for a long time interval as illustrated by the dashed line portion 206 of plot 201. For example, the transient may have slew rates that vary anywhere between one volt per nano-second to one hundred volts per nano-second. The extended time interval formed by circuit 112 maintains current 58 for a time sufficient to discharge such a slowly decreasing transient.

In order to facilitate the hereinbefore described functionality, circuit 90 includes that a source of transistor 92 is commonly connected to receive the reference signal from Ref.95, and to a source of transistor 93. A drain of transistor 92 is commonly connected to a drain of transistor 94, a gate of transistor 94, and to a gate of transistor 107. A source of transistor 94, is commonly connected to a source of transistor 107 and to return 18. A drain of transistor 107 is commonly connected to node 109, to a drain of transistor 97, and to a drain of transistor 101. A source of transistor 97 is commonly connected to a source of transistor 98 and to output 21. A drain of transistor 98 is commonly connected to a gate of transistor 92, a gate of transistor 93, a gate of transistor 97, a gate of transistor 98, a gate of transistor 101, a gate of transistor 102, and to a first terminal of resistor 99. A second terminal of resistor 99 is connected to return 18. A source of transistor 101 is commonly connected to output 22, and a source of transistor 102. A gate of transistor 108 is connected to node 109. A drain of transistor 108 is connected to input 17. A source of transistor 108 is commonly connected to a first terminal of resistor 114, a first terminal of capacitor 113, and the input of buffer 115. A second terminal of capacitor 113 and a second terminal of resistor 114 are commonly connected to return 18. The output of buffer 115 is connected to a control input of switch 59. A first terminal of switch 59 is connected to output 47 of circuit 46. A second terminal of switch 59 is connected to a first terminal of current source 57. A second terminal of current source 57 is connected to return 18. A first terminal of switch 50 is connected to output 47 and a second terminal of current source 49 is connected to return 18. A control input of switch 50 is connected to input 19.

Figure 6:
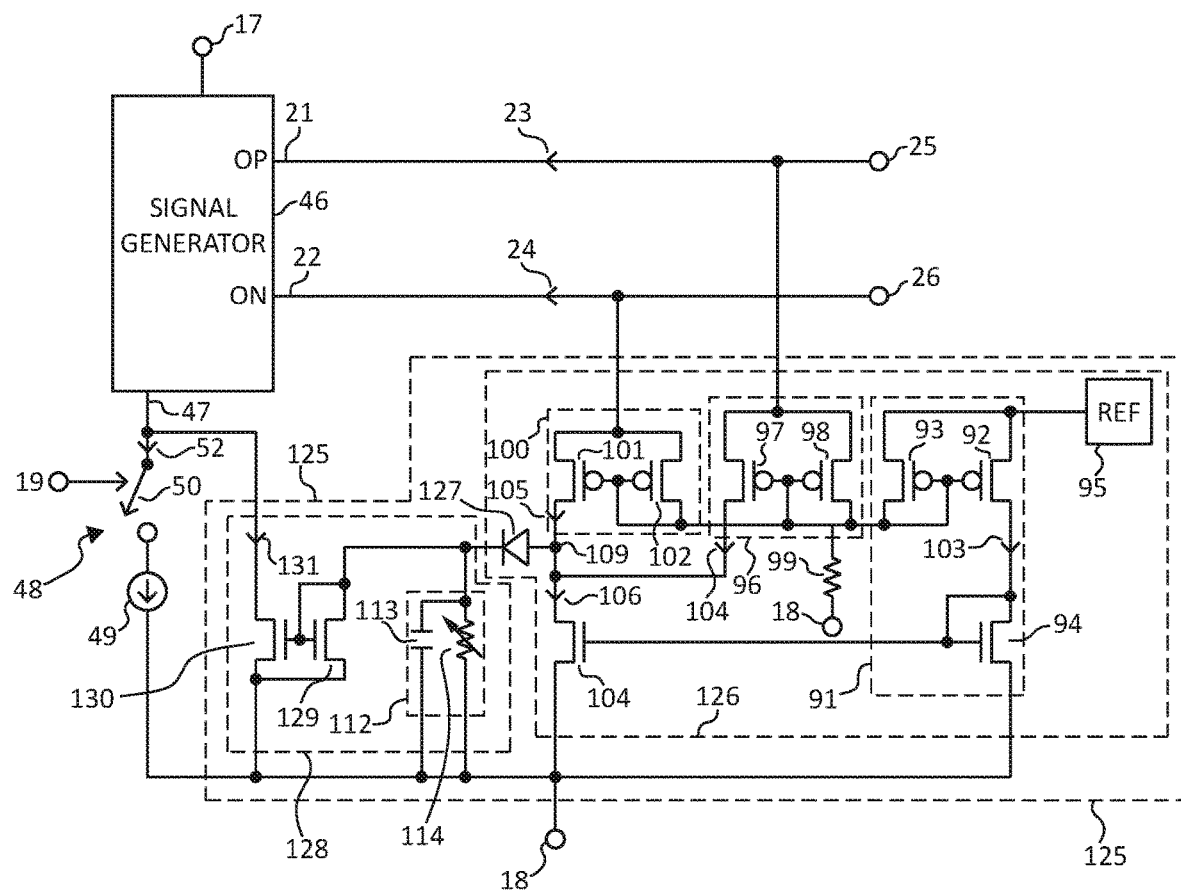
FIG. 6 schematically illustrates an example of an embodiment of a portion of a transient compensation circuit that may have an embodiment that may be an alternate embodiment of at least one of the circuits of FIG. 1 or FIG. 4 in accordance with the present invention.

FIG. 6 schematically illustrates an example of an embodiment of a portion of a transient compensation circuit 125 that may have an embodiment that may be an alternate embodiment of circuit 55 (FIG. 1) or of circuit 90 (FIG. 4). Circuit 125 includes a transient detection circuit 126, and a compensation circuit 128 that may have embodiments that may be alternate embodiments of respective circuits 111 and 116 (FIG. 4). Circuit 126 is substantially similar to circuit 111 except that transistor 108 of circuit 111 (FIG. 4) is replaced by a diode 127. Also, buffer 115, switch 59, and source 57 of circuit 116 (FIG. 4) are replaced by current mirror transistors 129 and 130. Circuit 128 is an analog circuit instead of the digital implementation of circuit 116.

In response to current 106 being less than current 106, capacitor 113 and resistor 114 hold the drain of transistor 129 low. As the value of current 106 increases to be greater than current 103, the increase is reflected through diode 127 as a current that increases the voltage on the drain of transistor 129 and forms a current through transistor 129. Transistor 130 mirrors the current through transistor 129 to form current 131 that is representative of the increased value of outputs 21 or 22. Thus, the value of current 131 is representative of the value of output 21 or 22 that is outside the oscillating range, for example greater than the first value or less than the third value. Consequently, current 131 varies proportionally to the value of outputs 21 and/or 22.

In order to assist in forming the hereinbefore described functionality for circuit 125, node 109 is connected to an anode of diode 127, and a cathode of diode 127 is commonly connected to the drain of transistor 129 and to the first terminal of resistor 114 and capacitor 113. A source of transistor 129 is commonly connected to the source of transistor 130 and to return 18. A drain of transistor 130 is connected to output 47.

Figure 7:
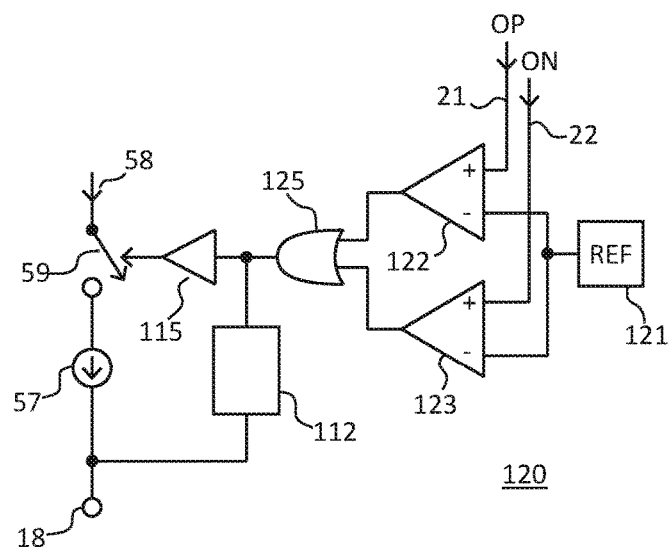
FIG. 7 schematically illustrates an example of an embodiment of a portion of a transient compensation circuit that may have an embodiment that is an alternate embodiment of at least one circuit of FIG. 1 or 4 or 6 in accordance with the present invention.

FIG. 7 schematically illustrates an example of an embodiment of a portion of a transient compensation circuit 120 that may have an embodiment that is an alternate embodiment of circuits 55 or 90. In an embodiment, circuit 120 may be configured to detect the value of at least one of outputs 21 or 22 being outside the oscillating range and responsively form the compensation signal to cause the output to return to substantially within the oscillating range. For example, circuit 120 may be configured to cause current 58 to flow from output 47 to current source 57, so that the transient current does not flow through bias circuit 48. An embodiment may include that circuit 120 compares one or both of outputs 21 and 22 to a threshold or reference value and forms current 58 in response to detecting the corresponding output changing to a value outside the oscillating range.

Figure 8:
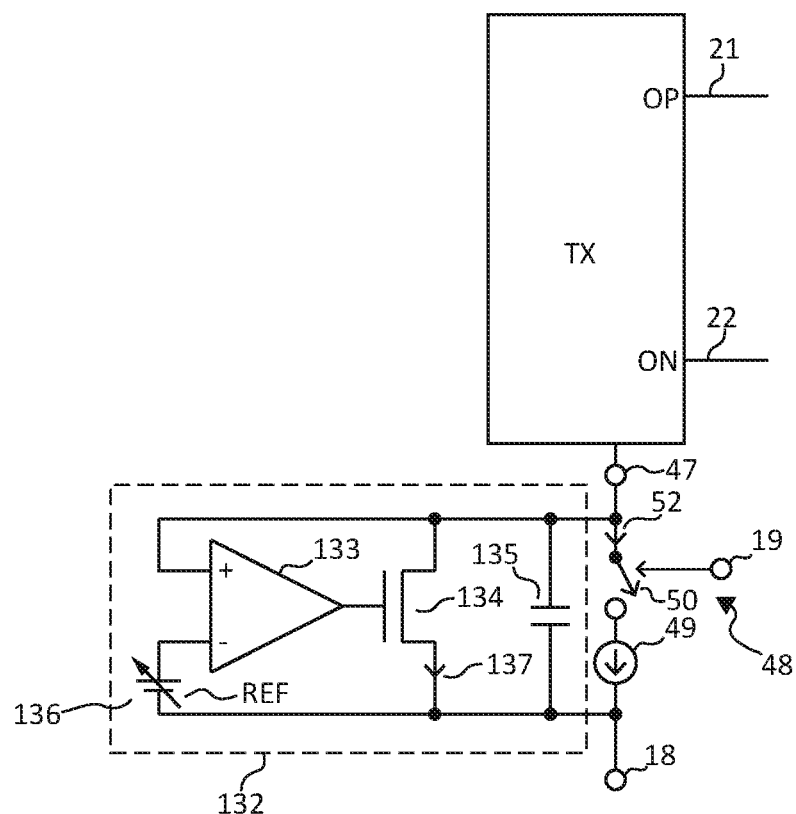
FIG. 8 schematically illustrates an example of an embodiment of a portion of a transient compensation circuit that may have an embodiment that may be an alternate embodiment of at least one of the circuits FIG. 1 or 4 or 6 or 7 in accordance with the present invention.

FIG. 8 schematically illustrates an example of an embodiment of a portion of a transient compensation circuit 132 that may have an embodiment that may be an alternate embodiment of any of circuits 55 or 90 or 125. Circuit 132 is configured as a shunt regulator that includes an amplifier 133, a transistor 134, and a reference generator circuit or Ref. circuit 136. Circuit 132 may, in some embodiments, include a capacitor 135. As discussed before, the decreasing edge of the transient causes the voltage at output 47 to change representatively of the amount that outputs 21 and 22 change from the oscillating range. Circuit 132 detects the value of either or both of outputs 21 and 22 increasing to greater than the inactive level. For example, the transient current may cause the value of output 47 to increase to a value greater than the normal value of output 47 during the active state of outputs 21 and 22. For example, the value of Ref. 136 may be set to a value that is representative of the oscillating range of outputs 21 or 22. Circuit 132 is configured to form a compensation signal, such as for example current 137 through transistor 134, in response to detecting the value of output 47 changing from the normal value. Circuit 132 forms current 137 to conduct the transient current from outputs 21 and/or 22 through output 47 and through transistor 134 and thereby changing the value of outputs 21 and/or 22 to substantially the oscillating range. For example, as the value of outputs 21 and/or 22 increase to greater than the oscillating range, current 137 corresponding increases. Thus, the value of current 137 is representative of the value of outputs 21 and/or 22. In some embodiments, current 131 may be formed to vary proportionally to the amount that outputs 21 and/or 22 change from the oscillating value.

In order to assist in forming the hereinbefore described functionality for circuit 132, a non-inverting input of amplifier 133 is commonly connected to a drain of transistor 134, a first terminal of capacitor 135, and output 47. An inverting input of amplifier 133 is connected to a first terminal of Ref. 136. A second terminal of Ref. 136 is commonly connected to a source of transistor 134, a second terminal of capacitor 135, and return 18.

Figure 9:
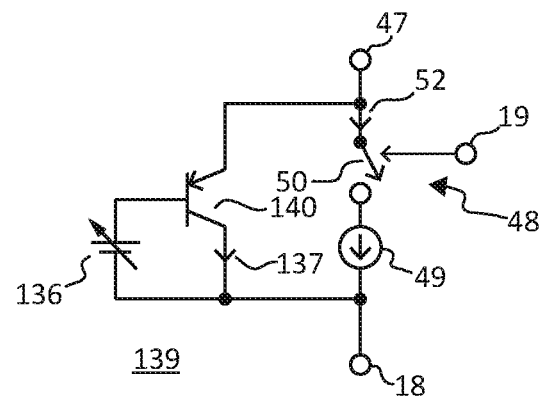
FIG. 9 schematically illustrates an example of an embodiment of a portion of a transient compensation circuit that may have an embodiment that may be an alternate embodiment of at least one of the circuits FIG. 1 or 4 or 6 or 7 or 8 in accordance with the present invention.

FIG. 9 schematically illustrates an example of an embodiment of a portion of a transient compensation circuit 139 that may have an embodiment that may be an alternate embodiment of any of circuits 55 or 90 or 120 or 125 or 132. Circuit 139 functions similarly to circuit 132 except that circuit 139 does not have amplifier 133 and transistor 134, and both are replaced by a transistor 140. Once the value of output 47 changes from the value of Ref. 136 plus the base-emitter threshold voltage of transistor 140, transistor 140 is enabled to conduct current 137 which varies proportionally to the amount outputs 21 and 22 change from the oscillating value.

In order to assist in forming the hereinbefore described functionality for circuit 139, an emitter of transistor 140 is connected to output 47. A base of transistor 140 is connected to the first terminal of Ref. 136, and a collector of transistor 140 is connected to return 18. Those skilled in the art will appreciate that transistor 140 may be replaced by a P-channel MOS transistor.

Figure 10:
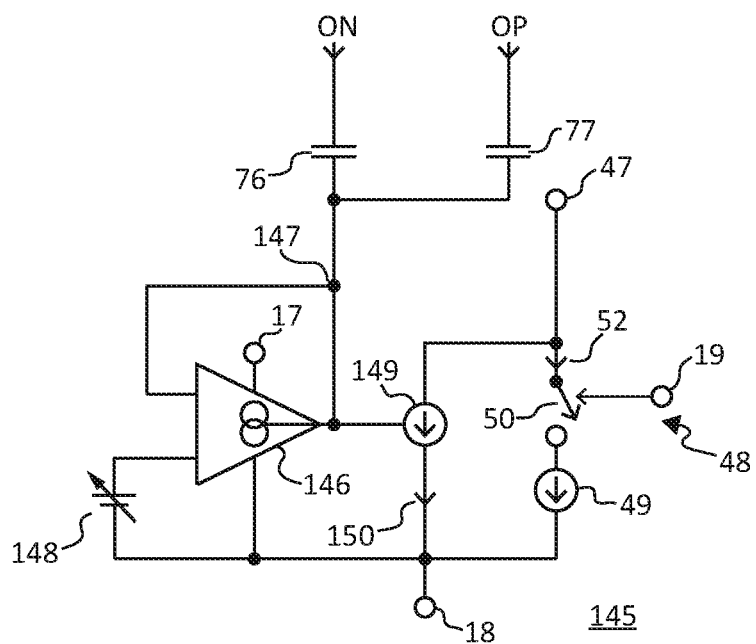
FIG. 10 schematically illustrates an example of an embodiment of a portion of a transient compensation circuit that may have an embodiment that may be an alternate embodiment of at least one of the circuits FIG. 1 or 4 or 6-9 in accordance with the present invention.

FIG. 10 schematically illustrates an example of an embodiment of a portion of a transient compensation circuit 145 that may have an embodiment that may be an alternate embodiment of any of circuits 55 or 90 or 120 or 125 or 132 or 139. Circuit 145 includes a transconductance amplifier 146, a reference generator circuit or Ref. 148, and a variable current source 149. Amplifier 146 holds node 147 at a value formed by Ref. 148. Once either or both of outputs 21 and/or 22 changes from the normal value, amplifier 146 provides a control signal to source 149 to vary the value of current 150 responsively to changes in one of or both of outputs 21 and/or 22.

In order to assist in forming the hereinbefore described functionality for circuit 145, an inverting input of amplifier 146 is commonly connected to an output of amplifier 146, to a control input of variable current source 149, to output 47, and to a first terminal of variable current source 149. A second terminal of variable current source 149 is connected to return 18. A non-inverting input of amplifier 146 is connected to a first terminal of Ref. 136.

Figure 11:
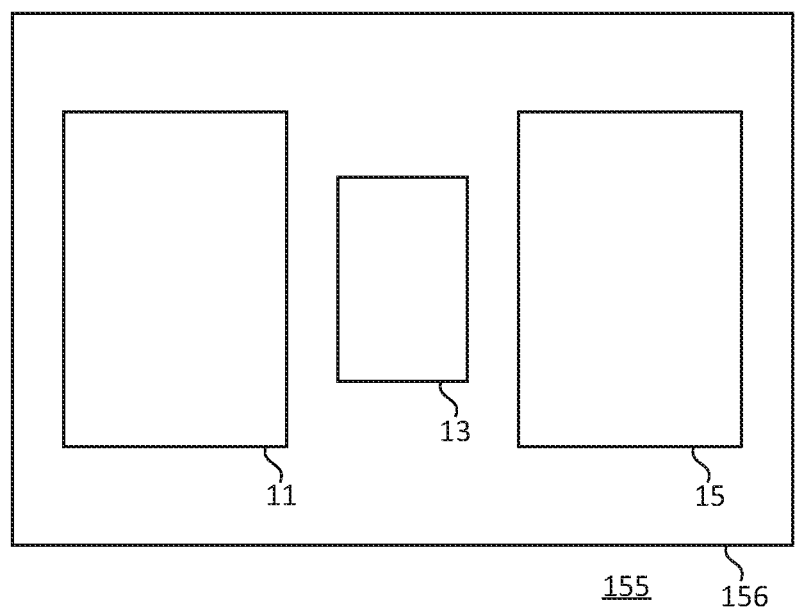
FIG. 11 illustrates an enlarged plan view of a semiconductor device that includes at least one of the circuits of FIG. 1 or 4 or 6-9 in accordance with the present invention.

FIG. 11 illustrates an enlarged plan view of a portion of an embodiment of a semiconductor device or integrated circuit 155 that is formed on a semiconductor die 156. In an embodiment, any one of transformer 13 or circuits 11 or 15, or alternately, any one of circuits 89, 120, 125, 132, 139, or 145 may be formed on die 156. Die 156 may also include other circuits that are not shown in FIG. 11 for simplicity of the drawing. In some embodiments, circuit 11 and 13 may be formed on die 156 and circuit 15 may be formed on a different die but assembled into the same package as circuit 11. The circuits may be formed on die 156 by semiconductor manufacturing techniques that are well known to those skilled in the art.

From all the foregoing, one skilled in the art will appreciate that an example of an embodiment of a transmitter circuit for an isolated communication circuit may comprise:

a bias circuit Ref, such as for example circuit 48, configured to form a bias current, such as for example current 52, of a first value in response to an asserted state of a received data signal, such as for example signal DI;

a signal generation circuit, such as for example circuit 46, having an oscillator, such as for example oscillator 70, the oscillator configured to receive the first value of the bias current and responsively form an oscillating differential output signal, such as for example signal OP or alternately ON, oscillating between a second value and a third value on a first output, such as for example output 21, and between a fourth value and a fifth value on a second output, such as for example output 22;

a transient detection circuit, such as for example circuit 111, having a current mirror circuit, such as for example the current mirror that includes transistors 92,97,1001, that includes a reference current mirror circuit, such as for example circuit 96, that forms a threshold value, such as for example current 103, the current mirror circuit having a first sensing circuit, such as for example circuit 96, and a second sensing circuit, such as for example circuit 100;

the first sensing circuit coupled to the first output, the first sensing circuit configured to form a first detection current, such as for example current 104, in response to detecting the first output receiving a first transient current for at least a portion of an interval of the oscillating differential output signal;

the second sensing circuit coupled to the second output, the second sensing circuit configured to form a second detection current, such as for example current 105, in response to detecting the second output receiving a second transient current for at least the portion of the interval of the oscillating differential output signal;

the transient detection circuit configured to assert a transient detected signal, such as for example signal 109, in response to detecting the first transient current or the second transient current; and a compensation circuit, such as for example circuit 116 or 128, coupled to the bias circuit, the compensation circuit configured to selectively form a compensation current, such as for example current 58, responsively to the transient detected signal wherein the compensation circuit conducts the compensation current from at least one of the first transient current or the second transient current through the oscillator and through the compensation circuit, and wherein the compensation current does not flow through the bias circuit.

An embodiment may include that the compensation current may flow from a first node, such as for example node 47, of the oscillator through the compensation circuit, and wherein the bias current flows from the first node through the bias circuit.

An embodiment of the bias circuit may include a first current source, such as for example source 49, that forms the bias current, the first current source having a first terminal coupled to a first node of the signal generation circuit, the compensation circuit including a second current source, such as for example source 52, having a first terminal coupled to the first node.

In an embodiment, the compensation circuit may include a timer circuit, such as for example circuit 112, that causes the compensation circuit to continue forming the compensation current after the transient detected signal is negated.

An embodiment may include that the first sensing circuit may include a first transistor, such as for example transistor 97, coupled to the first output, the first transistor configured to form the first detection current at an output of the first sensing circuit.

Another embodiment may include that the second sensing circuit includes a second transistor, such as for example transistor 101, coupled to the second output, the second transistor configured to form the second detection current at an output of the second sensing circuit.

Other embodiments may include that the current mirror circuit sums together first detection current and the second detection current to form the transient detected signal.

In an embodiment, the compensation circuit may be configured to vary the compensation current proportionally to variations of at least one of the first transient current or the second transient current.

Another embodiment may include that the compensation circuit may be configured to vary the compensation current proportionally to variations of the transient detected signal.

Those skilled in the art will also appreciate that an example of an embodiment of a transmitter circuit may comprise:

a bias generation circuit, such as for example circuit 48, configured to form a bias current, such as for example current 52;

a signal generation circuit, such as for example circuit 46, having an oscillator, such as for example the oscillator 70, the oscillator configured to receive the bias current at a bias output of the signal generation circuit, the signal generation circuit configured to responsively form an output signal, such as for example signal OP or ON, that has oscillations on an output of the signal generation circuit, the output signal having an active state that oscillates within an oscillation range;

a transient compensation circuit, such as for example any one of circuits 125/132/139/145, configured to detect a change in the output to outside of the oscillation range; and a compensation circuit, such as for example circuit 128, configured to form a compensation signal, such as for example signal 131, responsively to detecting the change wherein the compensation signal has a value representative of the change, the compensation circuit configured to form the compensation signal for at least a portion of the oscillations of the output signal wherein the compensation signal substantially does not change the bias current.

An embodiment of the transmitter circuit may include that the compensation signal may be a compensation current that flow from the oscillator but not through the bias generation circuit.

In an embodiment, the bias generation circuit may include a first current source, such as for example source 49, configured to form the bias current in response to an asserted state of a data input signal, the compensation circuit including a second current source, such as for example source 57 coupled in parallel with the first current source.

An embodiment may include that the transmitter circuit, such as for example any one of circuits 132/139/145, a detect an increase in the output of the signal generation circuit to greater than the oscillation range, and forms the compensation signal as a compensation current having a current value this proportional to the increase.

Another embodiment may include that the compensation circuit may include an amplifier, such as for example amplifier 146, configured to receive the output of the signal generation circuit and form a control signal to control a variable current source, such as for example source 149, that forms the compensation current.

An embodiment may include that the compensation circuit may include a transistor, such as for example transistor 140, having a first current carrying electrode coupled to the output of the signal generation circuit, a second current carrying electrode coupled to a common return, and a control electrode coupled to receive a reference voltage, such as for example Ref 136, that is representative of the change.

In an embodiment, the compensation circuit may include a shunt regulator, such as for example regulator 132, coupled in parallel with the bias generation circuit.

An embodiment may include that the shunt regulator may include an amplifier configured to receive a reference signal that is representative of the change and to receive a signal from the output of the signal generation circuit, the shunt regulator including a transistor having a first current carrying electrode coupled to the output of the signal generation circuit, a second current carrying electrode coupled to a common return, and a control electrode coupled to receive an output of the amplifier.

Those skilled in the art will also appreciate that an example of an embodiment of a method of forming a semiconductor device may comprise:

forming a signal generation circuit, such as for example circuit 46, to form an oscillating differential output signal, such as for example at least one of OP or ON, having one or more values on at least one output, such as for example output 21; and forming a transient compensation circuit, such as for example any one of circuits 11/90/125/120/132/139/145, to detect a transient current coupled to the at least one output and responsively form a compensation current, such as for example current 58, to conduct at least a portion of the transient current from the signal generation circuit to the transient compensation circuit for at least an interval of the oscillating differential output signal.

An embodiment of the method may also include configuring the transient compensation circuit to detect a change of the at least one output to other than the one or more values, and responsively form the compensation current wherein the transient compensation circuit forms the compensation current while the signal generation circuit is receiving a bias current from a bias generation circuit.

Another embodiment may include configuring the transient compensation circuit to form a virtual ground that has a capacitive coupling to the at least one output wherein the transient compensation circuit forms the compensation current to conduct the transient current though the capacitive coupling.

The method may have an embodiment that includes configuring the transient compensation circuit to conduct the compensation current in addition to the compensation current.

An embodiment of the transmitter circuit may include that the compensation circuit the compensation current and the bias circuit conducts the bias current.

Another embodiment of the transmitter circuit may include that the compensation circuit may conduct the compensation current from a bias output of the signal generation circuit and the bias circuit conducts the bias current from the bias output.

Those skilled in the art will also appreciate that an example of an embodiment of a transmitter circuit may comprise:

a bias circuit, such as for example circuit 48, configured to form a bias current, such as for example current 52;

a signal generation circuit, such as for example circuit 46, having an oscillator, such as for example oscillator 70, configured to form an output signal having oscillations on an output of the signal generation circuit, the output signal having an active state that oscillates within an oscillation range;

a transient compensation circuit, such as for example any one of circuits 125/132/139/145, configured to detect a change in the output signal to outside of the oscillation range; and a compensation circuit, such as for example circuit 128, configured to form a compensation signal, such as for example signal 131, responsively to detecting the change wherein the compensation signal has a value representative of the change, the compensation circuit configured to form the compensation signal for at least a portion of the oscillations of the output signal wherein the compensation circuit forms the compensation signal in addition to the bias current.

In an embodiment, the compensation circuit may form the compensation signal as a compensation current that conducts at least a portion of a transient current from the at least one output for at least a portion of the oscillations of the output signal.

In view of all of the above, it is evident that a novel device and method is disclosed. Included, among other features, is forming a circuit to detect a transient current on an output of the device and to discharge the transient current while the device is transmitting a signal. Discharging the transient current while transmitting the signal facilitates continuing to transmit the signal even if a transient is received. Configuring the circuit to conduct the transient current while still providing a bias current to an oscillator of the circuit facilitates more reliably transmitting the signal.

While the subject matter of the descriptions are described with specific preferred embodiments and example embodiments, the foregoing drawings and descriptions thereof depict only typical and non-limiting examples of embodiments of the subject matter and are not therefore to be considered to be limiting of its scope, it is evident that many alternatives and variations will be apparent to those skilled in the art. While the subject matter of the descriptions are described with specific preferred embodiments and example embodiments, the foregoing drawings and descriptions thereof depict only typical and non-limiting examples of embodiments of the subject matter and are not therefore to be considered to be limiting of its scope, it is evident that many alternatives and variations will be apparent to those skilled in the art.

While the subject matter of the descriptions is described with specific preferred embodiments and example embodiments, the foregoing drawings and descriptions thereof depict only typical and non-limiting examples of embodiments of the subject matter and are not therefore to be considered to be limiting of its scope. It is evident that many alternatives and variations will be apparent to those skilled in the art.

As the claims hereinafter reflect, inventive aspects may lie in less than all features of a single foregoing disclosed embodiment. Thus, the hereinafter expressed claims are hereby expressly incorporated into this Detailed Description of the Drawings, with each claim standing on its own as a separate embodiment of an invention. Furthermore, while some embodiments described herein include some but not other features included in other embodiments, combinations of features of different embodiments are meant to be within the scope of the invention, and form different embodiments, as would be understood by those skilled in the art.

The invention claimed is:

1. A transmitter circuit for an isolated communication circuit comprising:

a bias circuit configured to form a bias current of a first value in response to an asserted state of a received data signal;

a signal generation circuit having an oscillator, the oscillator configured to receive the first value of the bias current and responsively form an oscillating differential output signal oscillating between a second value and a third value on a first output and between a fourth value and a fifth value on a second output;

a transient detection circuit having a current mirror circuit that includes a reference current mirror circuit that forms a threshold value, the current mirror circuit having a first sensing circuit and a second sensing circuit;
the first sensing circuit coupled to the first output, the first sensing circuit configured to form a first detection current in response to detecting the first output receiving a first transient current for at least a portion of an interval of the oscillating differential output signal;
the second sensing circuit coupled to the second output, the second sensing circuit configured to form a second detection current in response to detecting the second output receiving a second transient current for at least the portion of the interval of the oscillating differential output signal;
the transient detection circuit configured to assert a transient detected signal in response to detecting the first transient current or the second transient current; and
a compensation circuit coupled to the bias circuit, the compensation circuit configured to selectively form a compensation current responsively to the transient detected signal wherein the compensation circuit conducts the compensation current from at least one of the first transient current or the second transient current through the oscillator and through the compensation circuit, and wherein the compensation current does not flow through the bias circuit.

2. The transmitter circuit of claim 1 wherein the compensation current flows from a first node of the oscillator through the compensation circuit, and wherein the bias current flows from the first node through the bias circuit.

3. The transmitter circuit of claim 1 wherein the bias circuit includes a first current source that forms the bias current, the first current source having a first terminal coupled to a first node of the signal generation circuit, the compensation circuit including a second current source having a first terminal coupled to the first node.

4. The transmitter circuit of claim 1 wherein the compensation circuit includes a timer circuit that causes the compensation circuit to continue forming the compensation current after the transient detected signal is negated.

5. The transmitter circuit of claim 1 wherein the first sensing circuit includes a first transistor coupled to the first output, the first transistor configured to form the first detection current at an output of the first sensing circuit.

6. The transmitter circuit of claim 5 wherein the second sensing circuit includes a second transistor coupled to the second output, the second transistor configured to form the second detection current at an output of the second sensing circuit.

7. The transmitter circuit of claim 6 wherein the current mirror circuit sums together first detection current and the second detection current to form the transient detected signal.

8. The transmitter circuit of claim 1 wherein the compensation circuit is configured to vary the compensation current proportionally to variations of at least one of the first transient current or the second transient current.

9. The transmitter circuit of claim 8 wherein the compensation circuit is configured to vary the compensation current proportionally to variations of the transient detected signal.

10. A semiconductor device having a transmitter circuit comprising:
a bias generation circuit configured to form a bias current;
a signal generation circuit having an oscillator, the oscillator configured to receive the bias current at a bias output of the signal generation circuit, the signal generation circuit configured to responsively form an output signal that has oscillations on an output of the signal generation circuit, the output signal having an active state that oscillates within an oscillation range;
a transient compensation circuit configured to detect a change in the output to outside of the oscillation range; and
a compensation circuit configured to form a compensation signal responsively to detecting the change wherein the compensation signal has a value representative of the change, the compensation circuit configured to form the compensation signal for at least a portion of the oscillations of the output signal wherein the compensation signal substantially does not change the bias current.

11. The transmitter circuit of claim 10 wherein the compensation signal is a compensation current that flow from the oscillator but not through the bias generation circuit.

12. The transmitter circuit of claim 10 wherein the bias generation circuit includes a first current source configured to form the bias current in response to an asserted state of a data input signal, the compensation circuit including a second current source coupled in parallel with the first current source.

13. The transmitter circuit of claim 10 wherein the transmitter circuit detects an increase in the output of the signal generation circuit to greater than the oscillation range, and forms the compensation signal as a compensation current having a current value this proportional to the increase.

14. The transmitter circuit of claim 13 wherein the compensation circuit includes an amplifier configured to receive the output of the signal generation circuit and form a control signal to control a variable current source that forms the compensation current.

15. The transmitter circuit of claim 13 wherein the compensation circuit includes a transistor having a first current carrying electrode coupled to the output of the signal generation circuit, a second current carrying electrode coupled to a common return, and a control electrode coupled to receive a reference voltage that is representative of the change.

16. The transmitter circuit of claim 13 wherein the compensation circuit includes a shunt regulator coupled in parallel with the bias generation circuit.

17. The transmitter circuit of claim 16 wherein the shunt regulator includes an amplifier configured to receive a reference signal that is representative of the change and to receive a signal from the output of the signal generation circuit, the shunt regulator including a transistor having a first current carrying electrode coupled to the output of the signal generation circuit, a second current carrying electrode coupled to a common return, and a control electrode coupled to receive an output of the amplifier.

18. A method of forming a semiconductor device comprising:
forming a signal generation circuit to form an oscillating differential output signal having one or more values on at least one output; and
forming a transient compensation circuit to detect a transient current coupled to the at least one output and responsively form a compensation current to conduct at least a portion of the transient current from the signal generation circuit to the transient compensation circuit for at least an interval of the oscillating differential output signal; and
configuring the transient compensation circuit to detect a change of the at least one output to other than the one or more values, and responsively form the compensation current wherein the transient compensation circuit forms the compensation current for at least a portion of while the signal generation circuit is receiving a bias current from a bias generation circuit.

19. The method of claim 18 including configuring the transient compensation circuit to form a virtual ground that has a capacitive coupling to the at least one output wherein the transient compensation circuit forms the compensation current to conduct the transient current though the capacitive coupling.

* * * * *